United States Patent [19]
Bailey

[11] 3,876,660
[45] Apr. 8, 1975

[54] PYRROLYL PHENYL KETONES

[75] Inventor: Denis M. Bailey, East Greenbush, N.Y.

[73] Assignee: Sterling Drug Inc., New York, N.Y.

[22] Filed: Apr. 11, 1973

[21] Appl. No.: 350,104

[52] U.S. Cl...... 260/326.5 J; 260/326.5 R; 424/274
[51] Int. Cl............................................ C07d 27/26
[58] Field of Search .............................. 260/326.5 J

[56] References Cited
UNITED STATES PATENTS
3,402,174   9/1968   Pachter........................... 260/247.5

*Primary Examiner*—Joseph A. Narcavage
*Attorney, Agent, or Firm*—William G. Webb; B. W. Wyatt

[57] ABSTRACT

4,5-Dihalopyrrol-2-yl phenyl ketones, prepared either by halogenation of a pyrrol-2-yl phenyl ketone or by Friedel-Crafts condensation of a 4,5-dihalopyrrole-2-carboxylic acid halide with benzene or a substituted benzene, have antibacterial and antifungal activities.

24 Claims, No Drawings

PYRROLYL PHENYL KETONES

This invention relates to 4,5-dihalopyrrol-2-yl phenyl ketones having the formula:

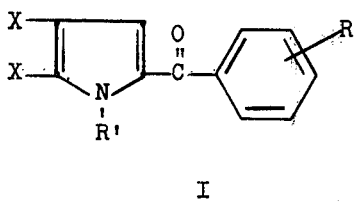

I wherein X is chlorine or bromine, both values of X being identical; R is a hydrogen, bromine, chlorine, or fluorine atom, a trifluoromethyl group, or from one to three lower-alkyl groups; and R' is hydrogen or lower-alkyl.

As used herein, the term "lower-alkyl" means saturated, monovalent, aliphatic radicals, including straight or branched-chain radicals, of from one to four carbon atoms, as illustrated by methyl, ethyl, propyl, isopropyl, butyl, sec.-butyl, isobutyl, t-butyl.

The compounds of formula I where R' is hydrogen are prepared by halogenation of an appropriate pyrrol-2-yl phenyl ketone of formula II. Alkylation of the 4,5-dihalopyrrol-2-yl phenyl ketones so-obtained with a lower-alkyl halide afford the compounds of formula I where R' is lower-alkyl. The method is represented by the following reaction sequence:

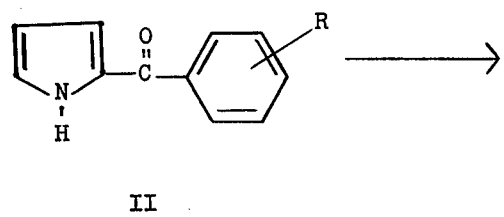

II

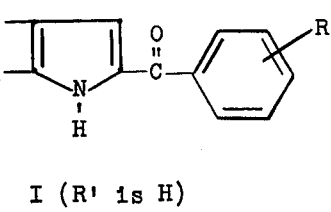

I (R' is H)

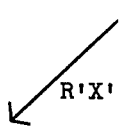

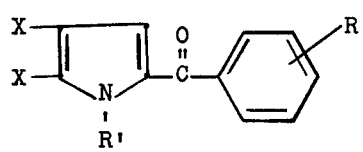

I (R' is lower-alkyl)

wherein X, R and R' have the meanings given above, and X' represents halogen. The halogenation of the compounds of formula II is carried out with elemental chlorine or bromine at a temperature in the range from about 0°C. to about 20°C., and in an organic solvent inert under the conditions of the reaction, for example glacial acetic acid, chloroform, carbon tetrachloride, methylene dichloride, ethylene dichloride, and the like.

Conversion of the compounds of formula I where R' is hydrogen to the corresponding compounds where R' is lower-alkyl is effected by reaction of the former compounds with a lower-alkyl halide in an inert organic solvent, for example dimethylformamide, acetone, ethanol, isopropanol, and the like, and in the presence of an acid-acceptor, for example sodium or potassium carbonate. The reaction is advantageously carried out at the reflux temperature of the reaction mixture.

Alternatively, the compounds of formula I where R is hydrogen are prepared by a Friedel-Crafts condensation between benzene (or an appropriate R-substituted-benzene) and a 4,5-dihalopyrrole-2-carboxylic acid halide, as represented by the following reaction:

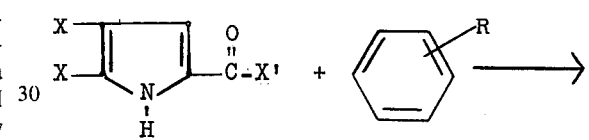

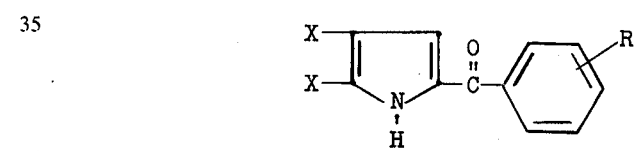

III wherein X and R have the meanings given above, and X' represents halogen. The reaction is carried out in the presence of a Lewis acid catalyst, for example stannic chloride or ferric chloride, at a temperature in the range from about 0° to about 20°C., and in an organic solvent inert under the conditions of the reaction, for example benzene, toluene or xylene. A preferred catalyst is stannic chloride, and a preferred solvent is benzene.

The pyrrol-2-yl phenyl ketones of formula II required as intermediates in the first-described method are prepared by a sequence of reactions involving condensation of one molar equivalent of pyrrole with one molar equivalent of benzaldehyde (or a suitable R-substituted-benzaldehyde) in the presence of one molar equivalent of sodium hydride. The resulting phenyl pyrrol-2-yl carbinol, which is not isolated, is then oxidized to the corresponding ketone by further reaction of the carbinol, in a Meerwein-Pondorf-Verley-type oxidation/reduction reaction, with a second molar equivalent each of sodium hydride and benzaldehyde (or substituted-benzaldehyde). The method is represented by the following reaction sequence:

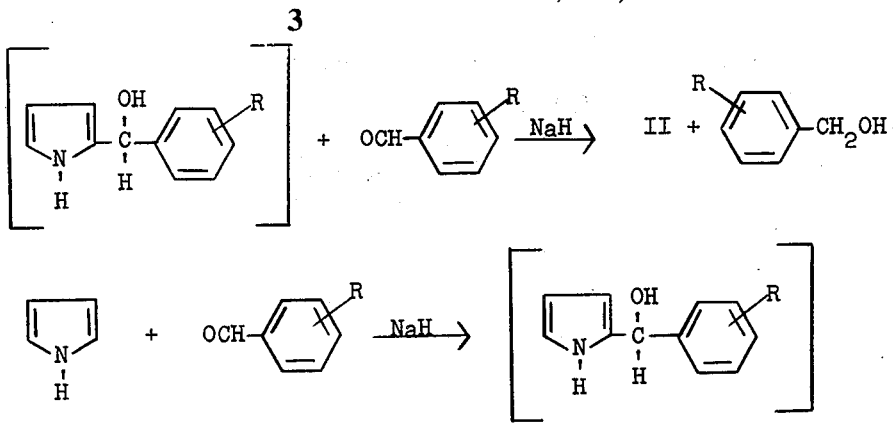

wherein R has the meanings given above. As indicated, in the initial step involving condensation of pyrrole with an appropriate benzaldehyde or substituted-benzaldehyde, one mole of the aldehyde condenses with one mole of pyrrole, while the other mole of aldehyde is reduced, in a second step, to the corresponding benzyl alcohol at the expense of the pyrrole/aldehyde carbinol condensation product. The reaction is carried out at a temperature from about 0°C. to about 50°C., and in an organic solvent inert under the conditions of the reaction, for example benzene, toluene, xylene or dimethylformamide.

Alternatively, the pyrrol-2-yl phenyl ketones of formula II are prepared by a Grignard reaction between a benzoyl halide (or an appropriate R-substituted-benzoyl halide) and the Grignard reagent prepared by reaction of a lower-alkyl magnesium halide with pyrrole. The method is represented by the following reaction:

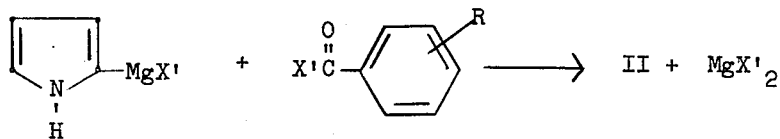

wherein R has the meanings given above, and X' represents halogen. The reaction is carried out in an organic ether, for example diethyl ether, dibutyl ether or tetrahydrofuran, and at a temperature from about 0°C. to about 20°C.

The 4,5-dihalopyrrole-2-carboxylic acid halides of formula III required as intermediates in the above-described Friedel-Crafts condensation are described in my copending application S.N. 349,973, filed Apr. 11, 1973, and as disclosed in that application, are prepared by alkaline saponification of the corresponding 4,5-dihalopyrrol-2-yl trihalomethyl ketones, which are also disclosed in said copending application S.N. 349,973, by warming an aqueous mixture of the ketone and aqueous alkali followed by reaction of the resulting 4,5-dihalopyrrole-2-carboxylic acid with a thionyl halide.

The 4,5-dihalopyrrol-2-yl trihalomethyl ketones required as intermediates for the preparation of the 4,5-dihalopyrrole-2-carboxylic acids are, in turn, prepared by reaction of pyrrole either with a trihaloacetyl halide or with a trihaloacetic anhydride, followed by halogenation of the resulting pyrrol-2-yl trihalomethyl ketone. The reaction of pyrrole with the trihaloacetyl halide or trihaloacetic anhydride takes place readily at room temperature by direct interaction of the two reactants in an aprotic organic solvent, for example diethyl ether, dioxane or tetrahydrofuran. The halogenation of the pyrrol-2-yl trihalomethyl ketones is carried out with elemental chlorine or bromine at a temperature in the range from about 0°C. to about 20°C. in an organic solvent inert under the conditions of the reaction, for example glacial acetic acid, chloroform, carbon tetrachloride, methylene dichloride, ethylene dichloride, and the like.

The compounds of formula I have been found to possess antibacterial activity, and certain species have, in addition, been found to have antifungal activity against *Ceratocystis ulmi*, the causative agent of Dutch elm disease. The antibacterial activity was determined using a modification of the Autotiter method described by Goss et al., Applied Microbiology, 16 (No. 9), 1,414–1,416 (1968) in which a 1,000 mcg./ml. solution of the test compound is prepared. The the first cup of the Autotray is added 0.1 ml. of the test solution. Activation of the Autotiter initiates a sequence of operations by which 0.05 ml. of the test compound solution is withdrawn from this cup by a Microtiter transfer loop and diluted in 0.05 ml. of sterile semisynthetic medium (glucose). After this operation, 0.05 ml. of inoculated semisynthetic medium is added automatically to each cup. The overall operation results in final drug concentrations ranging from 500 to 0.06 mcg./ml. in twofold decrements. The Autotray is incubated for 18–20 hours at 37°C., at which time the trays are examined visually for growth as evidenced by turbidity, and the concentration of the last sample in the series showing no growth (or no turbidity) is recorded as the minimal inhibitory concentration (MIC). The compounds of formula I were thus found to be antibacterially effective against *Staphylococcus aureus*, *Pseudomonas aeruginosa*, *Escherichia coli*, and *Proteus vulgaris* at concentrations from 2 to 500 mcg./ml.

Antifungal activity against *Ceratocystic ulmi* was determined using the following procedure: A solution of 2 mg. of the test compound in 2 ml. of acetone was prepared and 0.2 ml. of this solution was added via sterile glass pipette to 20 ml. of molten (42°C.) sterile potato dextrose agar. Mixing was accomplished by repeated inversion of the tube. The mixture was poured into a sterile Petri dish, allowed to solidify at room temperature, and then was inoculated by placing in the center of the agar-chemical mixture a section (3 mm. diameter) of agar permeated with the mycelium of *Ceratocystis ulmi*. The inoculated dish was incubated at 25°C. for 5 days when the diameter of growth was measured and compared to the growth which had occurred in a control culture. The percent inhibition was calculated as:

% Inhibition = [(Diameter of untreated − Diameter of treated)/Diameter of untreated] × 100

The actual determination of the numerical biological data definitive for a particular compound of formula I is readily determined by standard test procedures by technicians versed in biological test procedures, without the need for any extensive experimentation.

When used as antibacterial agents, the compounds of formula I can be formulated for use by preparing a dilute solution in an organic medium in which the compounds are soluble, for example ethyl alcohol or in such solution containing a surfactant, and are applied to a surface to be disinfected by conventional methods such as spraying, swabbing, immersion, and the like. Alternatively, the compounds can be formulated as ointments or creams by incorporating them in conventional ointment or cream bases, for example alkyl-polyether alcohols, cetyl alcohol, stearyl alcohol, and the like, or as jellies, by incorporating them in conventional jelly bases such as glycerol and tragacanth. They can also be formulated for use as aerosol sprays or foams.

When used as antifungal agents for the treatment of Dutch elm disease, the compounds are formulated as emulsifiable concentrates, as wettable powders or flowable pastes, or as true solutions, using in each case, adjuvants of acceptable phytotoxicological character.

In use, the formulations are applied either as a dilute spray to the foliage of the tree at a concentration of from 0.25 to 25 pounds per 100 gallons of water or as an injection into the tree trunk in the form of wettable powders, flowable pastes or solutions containing, in each case, from 5 to 96 percent active ingredient.

The molecular structures of the compounds of the invention were assigned on the basis of study of their infrared, ultraviolet, and NMR spectra, and confirmed by the correspondence between calculated and found values for elementary analyses for the elements.

The following examples will further illustrate the invention without, however, limiting it thereto. All melting points are uncorrected.

EXAMPLE 1

A slurry of 21.4 g. (0.05 mole) of a 56 percent dispersion of sodium hydride in mineral oil was freed of mineral oil by decantation three times with absolute benzene, suspended in 200 ml. of benzene and treated with 16.75 g. (0.025 mole) of pyrrole. On addition of 10 ml. of dimethylformamide to the mixture, a brisk reaction set in and was allowed to subside before the dropwise addition, with occasional cooling, of 53 g. (0.5 mole) of benzaldehyde. When addition of the benzaldehyde was complete, the mixture was refluxed for about thirty minutes, then cooled, washed with water, and the organic layer evaporated to dryness. The residual oil was distilled in vacuo, and the product collected at 122°–128°C./0.01 ml. to give 27.6 g. of pyrrol-2-yl phenyl ketone, m.p. 69°–75°C.

To a solution of 14.9 g. (0.1 mole) of pyrrol-2-yl phenyl ketone in 50 ml. of glacial acetic acid was added a solution of 32 g. (0.2 mole) of bromine in 50 ml. of glacial acetic acid. An additional 250–300 ml. of glacial acetic acid was added during the addition of the bromine solution in order to maintain a fluid reaction mixture. When addition of the bromine solution was complete, the solid which had separated was collected, washed with cold glacial acetic acid, and dried to give 19 g. of 4,5-dibromopyrrol-2-yl phenyl ketone, m.p. 170°–172°C.

EXAMPLE 2

To a solution of 14.9 g. (0.1 mole) of pyrrol-2-yl phenyl ketone (described above in Example 1) in 100 ml. of carbon tetrachloride and 50 ml. of glacial acetic acid was added dropwise with stirring a solution of 14.9 g. (0.21 mole) of chlorine in 250 ml. of carbon tetrachloride. When addition was complete, the reaction mixture was stirred for an additional hour, and the solid which separated was collected, dried, and recrystallized from carbon tetrachloride to give 6.7 g. of 4,5-dichloropyrrol-2-yl phenyl ketone, m.p. 189.5°–191.5°C.

EXAMPLE 3

Pyrrole (16.75 g., 0.25 mole) was reacted with 21.4 g. (0.5 mole) of sodium hydride and 70 g. (0.5 mole) of 4-chlorobenzaldehyde in 200 ml. of a 10 percent solution of dimethylformamide in benzene using the procedure described above in Example 1. The product was recrystallized from a diethyl ether/hexane mixture to give 21 g. of pyrrol-2-yl 4-chlorophenyl ketone, m.p. 95°–103°C.

A solution of 9.0 g. (0.04 mole) of pyrrol-2-yl 4-chlorophenyl ketone in 100 ml. of glacial acetic acid was treated with a solution of 14 g. (0.08 mole) of bromine in 50 ml. of glacial acetic acid using the procedure described above in Example 1. The product was recrystallized from an ethanol/ethyl acetate mixture to give 6.8 g. of 4,5-dibromopyrrol-2-yl 4-chlorophenyl ketone, m.p. 246°–248°C.

EXAMPLE 4

A solution of 10.0 g. (0.05 mole) of pyrrol-2-yl 4-chlorophenyl ketone (described above in Example 3) in 100 ml. of glacial acetic acid was reacted with a solution of 7.1 g. (0.1 mole) of chlorine in 200 ml. of glacial acetic acid using the procedure described above in Example 2. The product was recrystallized from an ethanol/ethyl acetate mixture to give 5.6 g. of 4,5-dichloropyrrol-2-yl 4-chlorophenyl ketone, m.p. 233°–235°C.

EXAMPLE 5

A solution of 6.7 g. (0.1 mole) of pyrrole in 70 ml. of diethyl ether was added slowly and with vigorous stirring to a solution of 20 g. (0.11 mole) of trichloroacetyl chloride in 20 ml. of diethyl ether. When addition was complete, stirring was continued for another half hour, and the solution then treated cautiously with an excess of 10 percent aqueous potassium carbonate. When frothing had subsided, the organic layer was separated, taken to dryness in vacuo, and the residual solid recrystallized with charcoaling from hexane to give 10.2 g. of pyrrol-2-yl trichloromethyl ketone, m.p. 74°–75°C.

The latter (0.05 mole) was dissolved in 25 ml. of glacial acetic acid, and the solution was treated slowly and with vigorous stirring with a solution of 16 g. (0.1 mole) of bromine in 25 ml. of glacial acetic acid. When addition was complete, the reaction mixture was warmed at about 50°C. in a water bath for about 15 minutes until the orange bromine color had disappeared. The solution was then concentrated to a small volume, treated cautiously with 10 percent aqueous potassium carbonate, and the mixture extracted with diethyl ether. The combined ether extracts, on drying and concentration, afforded a solid residue which was recrystallized from hexane to give 15.5 g. of 4,5-dibromopyrrol-2-yl trichloromethyl ketone, m.p. 136°–138°C.

A mixture of 74 g. (0.2 mole) of 4,5-dibromopyrrol-2-yl trichloromethyl ketone in 100 ml. of 10 percent aqueous sodium hydroxide and 150 ml. of water was heated and stirred on a steam bath for about 10 minutes until all solid had dissolved. The reaction mixture was acidified with concentrated hydrochloric acid, the mixture extracted with diethyl ether, and the combined organic extracts dried, charcoaled, concentrated to a volume of about 100 ml. and diluted with 300 ml. of hexane. The product which separated was collected and dried to give 45 g. of 4,5-dibromopyrrole-2-carboxylic acid, m.p. > 160°C. (dec.).

A mixture of 26.8 g. (0.1 mole) of 4,5-dibromopyrrole-2-carboxylic acid and 25 ml. of thionyl chloride was heated under reflux for about 20 minutes until all material had dissolved and evolution of hydrogen chloride had ceased. The mixture was then taken to dryness, the residue, consisting of 4,5-dibromopyrrole-2-carboxylic acid chloride, was dissolved in benzene, 12.0 g. (0.10 mole) of 1,3,5-trimethylbenzene added, and the mixture treated dropwise with stirring and cooling with 26 g. (0.1 mole) of stannic chloride. The mixture was allowed to stand overnight at room temperature and then treated with 200 ml. of cold water, stirred for about 30 minutes, extracted with diethyl ether, and the combined ether extracts, after washing with dilute hydrochloric acid and dilute sodium bicarbonate and drying, were evaporated to dryness giving a solid which was recrystallized from cyclohexane to give 15.0 g. of 4,5-dibromopyrrol-2-yl 2,4,6-trimethylphenyl ketone, m.p. 164°–166°C.

EXAMPLE 6

Ethyl magnesium bromide (0.1 mole) was prepared by addition of 10.9 g. (0.1 mole) of ethyl bromide to a mixture of 2.4 g. (0.1 mole) of magnesium in 40 ml. of anhydrous diethyl ether. When reaction was complete, the mixture was treated dropwise with cooling and stirring with a solution of 6.7 g. (0.1 mole) of pyrrole in 40 ml. of anhydrous diethyl ether. When addition was complete, the mixture was stirred and refluxed for about 30 minutes, then cooled and added dropwise, with stirring and cooling, to a solution of 21.9 g. (0.1 mole) of 3-bromobenzoyl chloride in 40 ml. of anhydrous ether. The mixture was stirred an additional 4 hours at room temperature, then treated with a concentrated aqueous ammonium chloride solution, filtered and the filtrate extracted with benzene. The combined organic extracts were dried, charcoaled, taken to dryness, and distilled in vacuo to give 13.5 g. of pyrrol-2-yl 3-bromophenyl ketone, b.p. 147°–149°C./0.15 mm., which solidified and was recrystallized from benzene/hexane to give 10 g. of material having m.p. 72°–75°C.

A solution of 10 g. (0.04 mole) of the above-described 4,5-dibromopyrrol-2-yl 3-bromophenyl ketone in 200 ml. of glacial acetic acid was treated with a solution of 12.75 g. (0.08 mole) of bromine in 50 ml. of glacial acetic acid using the procedure described above in Example 1. The product was recrystallized from an ethanol/pentane mixture to give 10 g. of 4,5-dibromopyrrol-2-yl 3-bromophenyl ketone, m.p. 210°–211°C.

EXAMPLE 7

A Grignard solution (0.2 mole) of pyrrole magnesium bromide, prepared from 4.8 g. (0.2 mole) of magnesium, 21.8 g. (0.2 mole) of ethyl bromide, and 13.4 g. (0.20 mole) of pyrrole in a total of 190 ml. of absolute ether, was treated with 30.8 g. (0.2 mole) of 4-methylbenzoyl chloride in 80 ml. of anhydrous diethyl ether using the procedure described above in Example 6. The product was purified by distillation in vacuo to give 18.5 g. of pyrrol-2-yl 4-methylphenyl ketone, b.p. 146°–150°C./0.05 mm.

The above-described pyrrol-2-yl 4-methylphenyl ketone (9.0 g., 0.05 mole) dissolved in 100 ml. of glacial acetic acid was reacted with a solution of 6.9 g. (0.097 mole) of chlorine in 200 ml. of glacial acetic acid using the procedure described above in Example 2. The product was recrystallized several times from absolute ethanol to give 2 g. of 4,5-dichloropyrrol-2-yl 4-methylphenyl ketone, m.p. 182°–184°C.

By substituting for the 4-methylbenzoyl chloride used in the above-described procedure a molar equivalent amount of 4-ethylbenzoyl chloride, 2-propylbenzoyl chloride, 3,5-diisopropylbenzoyl chloride, or 4-t-butylbenzoyl chloride, there can be obtained, respectively, 4,5-dichloropyrrol-2-yl 4-ethylphenyl ketone, 4,5-dichloropyrrol-2-yl 2-propylphenyl ketone, 4,5-dichloropyrrol-2-yl 3,5-diisopropylphenyl ketone and 4,5-dichloropyrrol-2-yl 4-t-butylphenyl ketone.

EXAMPLE 8

A solution of 9 g. (0.05 mole) of pyrrol-2-yl 4-methylphenyl ketone (described above in Example 7) in 200 ml. of glacial acetic acid was treated with a solution of 15.55 g. (0.97 mole) of bromine in 50 ml. of glacial acetic acid using the procedure described above in Example 1. The product was recrystallized from ethanol to give 3.7 g. of 4,5-dibromopyrrol-2-yl 4-methylphenyl ketone, m.p. 183°–185°C.

EXAMPLE 9

Reaction of 4,5-dibromopyrrol-2-yl 4-methylphenyl ketone (described above in Example 8) with a molar excess of methyl iodide, ethyl iodide, propyl iodide, isopropyl iodide, butyl iodide, isobutyl iodide or sec.-butyl iodide in boiling acetone in the presence of a molar equivalent amount of potassium carbonate affords, respectively, 4,5-dibromo-1-methylpyrrol-2-yl 4-methylphenyl ketone, 4,5-dibromo-1-ethylpyrrol-2-yl 4-methylphenyl ketone, 4,5-dibromo-1-propylpyrrol-2-yl 4-methylphenyl ketone, 4,5-dibromo-1-isopropylpyrrol-2-yl 4-methylphenyl ketone, 4,5-dibromo-1-butylpyrrol-2-yl 4-methylphenyl ketone, 4,5-dibromo-1-isobutylpyrrol-2-yl 4-methylphenyl ketone and 4,5-dibromo-1-sec.-butylpyrrol-2-yl 4-methylphenyl ketone.

EXAMPLE 10

A Grignard solution (0.3 mole) of pyrrole magnesium bromide, prepared from 7.2 g. (0.3 mole) of magnesium, 32.7 g. (0.3 mole) of ethyl bromide and 20.1 g. (0.3 mole) of pyrrole in a total of 290 ml.. of anhydrous diethyl ether, was treated with 52.5 g. (0.3 mole) of 3-chlorobenzoyl chloride in 120 ml. of anhydrous diethyl ether using the procedure described above in Example 6. The product was recrystallized from a benzene/pentane mixture to give 13 g. of pyrrol-2-yl 3-chlorophenyl ketone, m.p. 55°–75°C.

A solution of 13 g. (0.06 mole) of the above-described pyrrol-2-yl 3-chlorophenyl ketone in 200 ml. of glacial acetic acid was treated with a solution of 20.3 g. (0.13 mole) of bromine in 50 ml. of glacial acetic acid using the procedure described above in Example 1. The product was isolated directly from the reaction mixture by dilution with 500 ml. of cold water and was collected, washed with water, then with hexane, and dried to give 11.5 g. of 4,5-dibromopyrrol-2-yl 3-chlorophenyl ketone, m.p. 203°–205°C.

EXAMPLE 11

A solution of 11.5 g. (0.056 mole) of pyrrol-2-yl 3-chlorophenyl ketone (described above in Example 10) in 100 ml. of glacial acetic acid was treated with a solution of 8.16 g. (0.12 mole) of chlorine in 200 ml. of glacial acetic acid using the procedure described above in Example 2. The product was recrystallized from absolute ethanol to give 8.0 g. of 4,5-dichloropyrrol-2-yl 3-chlorophenyl ketone, m.p. 208°–209°C.

EXAMPLE 12

A Grignard solution (0.3 mole) of pyrrole magnesium bromide, prepared from 7.2 g.. (0.3 mole) of magnesium, 32.7 g. (0.3 mole) of ethyl bromide and 20.1 g. (0.3 mole) of pyrrole in a total of 290 ml. of anhydrous diethyl ether was treated with 52.5 g. (0.3 mole) of 2-chlorobenzoyl chloride in 120 ml. of anhydrous diethyl ether using the procedure described above in Example 6. The product was recrystallized from dilute ethanol to give 14.6 g. of pyrrol-2-yl 2-chlorophenyl ketone, m.p. 83°–86°C.

A solution of 10.5 g. (0.05 mole) of pyrrol-2-yl 2-chlorophenyl ketone in 200 ml. of glacial acetic acid was treated with a solution of 16.4 g. (0.10 mole) of bromine in 25 ml. of glacial acetic acid using the procedure described above in Example 1. The product was recrystallized from an ethanol/hexane mixture to give 2.5 g. of 4,5-dibromopyrrol-2-yl 2-chlorophenyl ketone, m.p. 193°–195°C.

EXAMPLE 13

A solution of 14.6 g. (0.71 mole) of pyrrol-2-yl 2-chlorophenyl ketone (described above in Example 12) dissolved in 100 ml. of glacial acetic acid was treated with a solution of 10.3 g. (0.15 mole) of chlorine in 200 ml. of glacial acetic acid using the procedure described above in Example 2. The product was isolated from the reaction mixture as a gum which was triturated with warm hexane to give 8 g. of 4,5-dichloropyrrol-2-yl 2-chlorophenyl ketone as a pale violet powder, m.p. 180°–182°C.

EXAMPLE 14

A Grignard solution (0.32 mole) of pyrrole magnesium bromide, prepared from 7.57 g. (0.32 mole) of magnesium, 34.4 g. (0.32 mole) of ethyl bromide and 21.2 g. (0.32 mole) of pyrrole in a total of 300 ml. of anhydrous diethyl ether, was treated with 50 g. (0.32 mole) of 4-fluorobenzoyl chloride in 125 ml. of anhydrous diethyl ether using the procedure described above in Example 6. The product was recrystallized from a benzene/hexane mixture to give 15 g. of pyrrol-2-yl 4-fluorophenyl ketone, m.p. 97°–99°C.

A solution of 9 g. (0.048 mole) of pyrrol-2-yl 4-fluorophenyl ketone in 200 ml. of glacial acetic acid was treated with a solution of 15.2 g. (0.95 mole) of bromine in 50 ml. of glacial acetic acid using the procedure described above in Example 1. The product was recrystallized from an ethanol/hexane mixture to give 8 g. of 4,5-dibromopyrrol-2-yl 4-fluorophenyl ketone, m.p. 215°–216°C.

EXAMPLE 15

A solution of 9 g. (0.048 mole) of pyrrol-2-yl 4-fluorophenyl ketone (described above in Example 14) in 100 ml. of glacial acetic acid was treated with a solution of 6.91 g. (0.098 mole) of chlorine in 150 ml. of glacial acetic acid using the procedure described above in Example 2. The product was recrystallized twice from ethanol to give 4.5 g. of 4,5-dichloropyrrol-2-yl 4-fluorophenyl ketone, m.p. 224°–226°C.

EXAMPLE 16

A Grignard solution (0.12 mole) of pyrrole magnesium bromide, prepared from 2.88 g. (0.12 mole) of magnesium, 13.1 g. (0.12 mole) of ethyl bromide and 8.04 g. (0.12 mole) of pyrrole in a total of 150 ml. of anhydrous ether, was treated with 25 g. (0.12 mole) of 4-trifluoromethylbenzoyl chloride in 75 ml. of anhydrous ether using the procedure described above in Example 6. The product was recrystallized from hexane to give 16 g. of pyrrol-2-yl 4-trifluoromethylphenyl ketone, m.p. 72°–76°C.

A solution of 8 g. (0.034 mole) of pyrrol-2-yl 4-trifluoromethylphenyl ketone dissolved in 200 ml. of glacial acetic acid was treated with a solution of 10.7 g. (0.067 mole) of bromine in 50 ml. of glacial acetic acid using the procedure described above in Example 1. The product was recrystallized from absolute ethanol to give 1.5 g. of 4,5-dibromopyrrol-2-yl 4-trifluoromethylphenyl ketone, m.p. 196°–198°C.

EXAMPLE 17

A solution of 8 g (0.034 mole) of pyrrol-2-yl 4-trifluoromethylphenyl ketone (described above in Example 16) dissolved in 100 ml. of glacial acetic acid was treated with a solution of 4.86 g. (0.069 mole) of chlorine in 150 ml. of glacial acetic acid using the procedure described above in Example 2. The product was recrystallized several times from ethanol to give 2.5 g. of 4,5-dichloropyrrol-2-yl 4-trifluoromethylphenyl ketone, m.p. 180°–181°C.

I claim:

1. A compound having the formula:

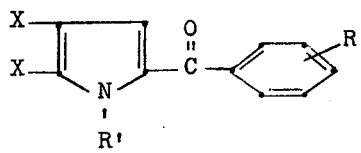

wherein X is bromine or chlorine, both values of X being identical; R is a hydrogen, bromine, chlorine or fluorine atom, a trifluoromethyl group, a t-butyl group, or from one to three non-tertiary lower-alkyl groups of one to four carbon atoms; and R' is hydrogen or lower-alkyl of one to four carbon atoms.

2. A compound according to claim 1 wherein R' is hydrogen.

3. A compound according to claim 2 wherein R is hydrogen.

4. A compound according to claim 2 wherein R is chlorine.

5. A compound according to claim 2 wherein R is bromine.

6. A compound according to claim 2 wherein R is fluorine.

7. A compound according to claim 2 wherein R is trifluoromethyl.

8. A compound according to claim 2 wherein R is from one to three non-tertiary lower-alkyl groups of one to four carbon atoms.

9. 4,5-Dibromopyrrol-2-yl phenyl ketone according to claim 3.

10. 4,5-Dichloropyrrol-2-yl phenyl ketone according to claim 3.

11. 4,5-Dibromopyrrol-2-yl 4-chlorophenyl ketone according to claim 4.

12. 4,5-Dichloropyrrol-2-yl 4-chlorophenyl ketone according to claim 4.

13. 4,5-Dibromopyrrol-2-yl 3-chlorophenyl ketone according to claim 4.

14. 4,5-Dichloropyrrol-2-yl 3-chlorophenyl ketone according to claim 4.

15. 4,5-Dibromopyrrol-2-yl 2-chlorophenyl ketone according to claim 4.

16. 4,5-Dichloropyrrol-2-yl 2-chlorophenyl ketone according to claim 4.

17. 4,5-Dibromopyrrol-2-yl 3-bromophenyl ketone according to claim 5.

18. 4,5-Dibromopyrrol-2-yl 4-fluorophenyl ketone according to claim 6.

19. 4,5-Dichloropyrrol-2-yl 4-fluorophenyl ketone according to claim 6.

20. 4,5-Dibromopyrrol-2-yl 4-trifluoromethylphenyl ketone according to claim 7.

21. 4,5-Dichloropyrrol-2-yl 4-trifluoromethylphenyl ketone according to claim 7.

22. 4,5-Dibromopyrrol-2-yl 4-methylphenyl ketone according to claim 8.

23. 4,5-Dichloropyrrol-2-yl 4-methylphenyl ketone according to claim 8.

24. 4,5-Dibromopyrrol-2-yl 2,4,6-trimethylphenyl ketone according to claim 8.

* * * * *

UNITED STATES PATENT AND TRADEMARK OFFICE
CERTIFICATE OF CORRECTION

PATENT NO. : 3,876,660

DATED : April 8, 1975

INVENTOR(S) : Denis M. Bailey

It is certified that error appears in the above–identified patent and that said Letters Patent are hereby corrected as shown below:

The flow diagram at columns 3 and 4, lines 1-50 should show:

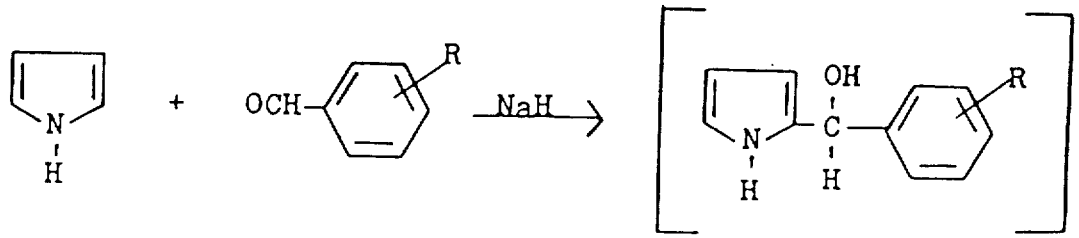

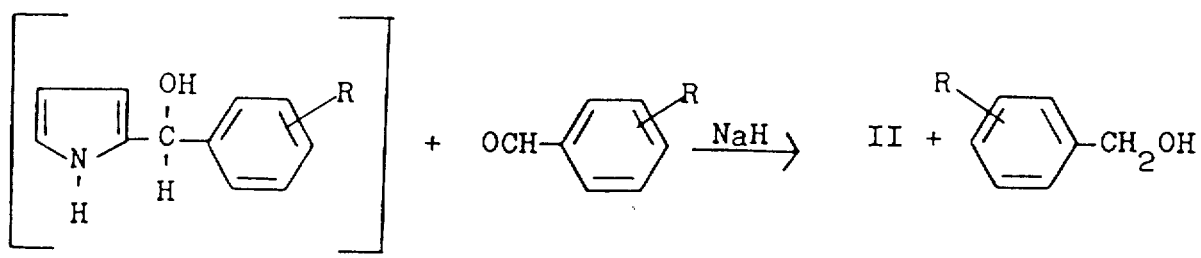

UNITED STATES PATENT AND TRADEMARK OFFICE
CERTIFICATE OF CORRECTION

PATENT NO. : 3,876,660
DATED : April 8, 1975
INVENTOR(S) : Denis M. Bailey

It is certified that error appears in the above-identified patent and that said Letters Patent are hereby corrected as shown below:

Column 4, line 32, "The the" should read --To the --.

Column 4, line 60, "Ceratocystic" should read --Ceratocystis--.

Signed and Sealed this

Ninth Day of March 1982

[SEAL]

Attest:

Attesting Officer

GERALD J. MOSSINGHOFF

Commissioner of Patents and Trademarks